(12) United States Patent
Suzuki (10) Patent No.: US 11,585,380 B2
(45) Date of Patent: Feb. 21, 2023

(54) SEAL MEMBER, AND BEARING DEVICE FOR WHEEL WITH SEAL MEMBER (71) Applicant: NTN Corporation, Osaka (JP)

(72) Inventor: Hyuuga Suzuki, Iwata (JP)

(73) Assignee: NTN CORPORATION, Osaka (JP)

( * ) Notice: Subject to any disclaimer, the term of this patent is extended or adjusted under 35 U.S.C. 154(b) by 3 days.

(21) Appl. No.: 17/262,040

(22) PCT Filed: Jul. 29, 2019

(86) PCT No.: PCT/JP2019/029650
§ 371 (c)(1),
(2) Date: Jan. 21, 2021

(87) PCT Pub. No.: WO2020/027050
PCT Pub. Date: Feb. 6, 2020

(65) Prior Publication Data
US 2021/0254668 A1    Aug. 19, 2021

(30) Foreign Application Priority Data
Jul. 31, 2018  (JP) .............................. JP2018-144631

(51) Int. Cl.
*F16C 33/78*   (2006.01)
*F16C 33/80*   (2006.01)
(Continued)

(52) U.S. Cl.
CPC ........ *F16C 33/7883* (2013.01); *F16C 33/805* (2013.01); *F16C 19/187* (2013.01); *F16C 41/007* (2013.01)

(58) Field of Classification Search
CPC .............. F16C 33/7869; F16C 33/7873; F16C 33/7876; F16C 33/7879; F16C 33/7883; F16C 33/80; F16C 33/805; F16C 41/007
See application file for complete search history.

(56) References Cited

U.S. PATENT DOCUMENTS 8,356,942 B2    1/2013  Torii et al.
9,534,636 B2 *  1/2017  Takayama ............ F16J 15/3264
(Continued)

FOREIGN PATENT DOCUMENTS

EP    0 942 188      9/1999
JP    2007-285499    11/2007
(Continued)

OTHER PUBLICATIONS

International Search Report dated Sep. 10, 2019 in International (PCT) Application No. PCT/JP2019/029650.
(Continued)

*Primary Examiner* — James Pilkington
(74) *Attorney, Agent, or Firm* — Wenderoth, Lind & Ponack, L.L.P.

(57) ABSTRACT

A seal member is provided in which lip wear is suppressed and resistance to muddy water is increased, as well as a bearing device for a wheel, provided with the seal member. An encoder (63) and an elastic member (65) form a labyrinth section (8) between an outer peripheral surface (61a) of a turned-back section (613) and an inner peripheral surface (64a) of an inner fitting section (641). The labyrinth section (8) extends axially outward and radially outward, and an inner peripheral surface (63c) of the encoder (63) that covers an inner peripheral surface (61c) of the turned-back section (613) is sloped axially inward and radially outward.

3 Claims, 6 Drawing Sheets

(51) Int. Cl.
*F16C 41/00* (2006.01)
*F16C 19/18* (2006.01)

(56) References Cited

U.S. PATENT DOCUMENTS

| | | | |
|---|---|---|---|
| 10,527,101 B2 * | 1/2020 | Shibayama | F16C 33/7883 |
| 10,907,688 B2 * | 2/2021 | Kamiji | F16C 33/80 |
| 2009/0127796 A1 * | 5/2009 | Kanzaki | F16J 15/4478 |
| | | | 277/562 |
| 2010/0232734 A1 | 9/2010 | Torii et al. | |

FOREIGN PATENT DOCUMENTS

| | | | |
|---|---|---|---|
| JP | 2009-115273 | | 5/2009 |
| JP | 2009-197884 | | 9/2009 |
| JP | 2015-86993 | | 5/2015 |
| JP | 2016-080145 | | 5/2016 |
| JP | 201680145 | * | 5/2016 |
| JP | 2018-066448 | | 4/2018 |
| WO | WO2018074543 | * | 4/2018 |

OTHER PUBLICATIONS

Notice of Reasons for Refusal dated May 10, 2022 in corresponding Japanese Patent Application No. 2018-144631, 7 pages.
Office Action dated May 26, 2022 in corresponding Chinese Patent Application No. 201980049080.0, 15 pages.

* cited by examiner

SEAL MEMBER, AND BEARING DEVICE FOR WHEEL WITH SEAL MEMBER

TECHNICAL FIELD

The present invention relates to a seal member and a bearing device for a wheel, provided with the seal member.

BACKGROUND ART

Conventionally, a bearing device for a wheel, which rotatably supports a wheel, has been known. The bearing device for a wheel includes an outer member having an outer raceway surface formed thereon, an inner member having an inner raceway surface formed thereon, and a rolling element interposed between respective raceway surfaces of the outer member and the inner member, to form a rolling bearing structure.

Incidentally, in the bearing device for a wheel, an annular space is formed between the outer member and the inner member. When muddy water enters the annular space, the raceways and the rolling element are damaged by sand dust or the like contained in the muddy water, which results in a shorter bearing life. Therefore, such a bearing device for a wheel is provided with a seal member in order to seal the annular space (see Patent Literatures 1 to 3).

A seal member described in Patent Literature 1 includes a slinger and a seal ring. The seal ring has a seal lip formed on an elastic member, and a tip edge of the seal lip is in contact with or close to the slinger. With such a structure, the seal member ensures hermeticity while the slinger and the seal ring are rotatable relative to each other. Note that there are a structure that increases the seal lip and a structure that adds a garter spring to increase resistance to muddy water.

A seal member described in Patent Literature 2 devises a part of shape of an encoder to form a labyrinth section between the encoder and an elastic member forming a seal ring. In addition, the labyrinth section extends in a predetermined direction. This structure is intended to discharge muddy water remaining in the labyrinth section by utilizing a centrifugal force generated by a rotation. However, in such a structure, since the labyrinth section has a short total length, there is a concern that the muddy water may pass through the labyrinth section and enter the inside. In addition, there is also a concern that a seal lip may be caught in sand dust or the like contained in the muddy water and cause lip wear.

The seal member described in Patent Literature 3 provides a turned-back section by bending the slinger to form the labyrinth section between the turned-back section and an elastic member forming a seal ring. Therefore, the labyrinth section is formed relatively long. This structure is intended to enhance a function of collecting muddy water and make it difficult for the muddy water to enter the inside by increasing a total length of the labyrinth section. However, in such a structure, there is a concern that if the muddy water passes through the labyrinth section and enters the inside, the muddy water cannot be drained and accumulates. In addition, there is also a concern that a seal lip may be caught in sand dust or the like contained in the muddy water and cause lip wear.

CITATIONS LIST

Patent Literatures

Patent Literature 1: JP-A 2009-115273 Gazette
Patent Literature 2: JP-A 2007-285499 Gazette
Patent Literature 3: JP-A 2009-197884 Gazette

SUMMARY OF INVENTION

Technical Problems

There is provided a seal member that suppresses lip wear and increases resistance to muddy water. Moreover, there is provided a bearing device for a wheel, provided with the seal member.

Solutions to Problems

A first invention is a seal member for a bearing device for a wheel, the bearing device being provided with an outer member, an inner member, and a rolling element interposed between the outer member and the inner member, the seal member including a slinger and a seal ring, wherein the slinger includes an outer fitting section that is externally fitted to the inner member, an outer plate section that extends radially outward from an axially outer end of the outer fitting section, and a turned-back section that extends axially inward from a radially outer end of the outer plate section, an encoder that is fixedly attached to the outer plate section covers at least an outer peripheral surface, a front end surface, and an inner peripheral surface of the turned-back section, the seal ring includes a core metal that is fitted to the outer member, the core metal includes an inner fitting section that is internally fitted to the outer member and an inner plate section that extends radially inward from an axially inner end of the inner fitting section, an elastic member that is fixedly attached to the inner plate section covers at least an inner peripheral surface of the inner fitting section, a labyrinth section is formed by the encoder and the elastic member, between the outer peripheral surface of the turned-back section and the inner peripheral surface of the inner fitting section, the labyrinth section extends axially outward and radially outward, and an inner peripheral surface of the encoder that covers the inner peripheral surface of the turned-back section is sloped axially inward and radially outward.

A second invention is the seal member according to the first invention, wherein a front end surface of the encoder that covers the front end surface of the turned-back section is sloped axially inward and radially outward.

A third invention is the seal member according to the first invention, wherein a front end surface of the encoder that covers the front end surface of the turned-back section is sloped axially outward and radially outward.

A fourth invention is the seal member according to the first invention, wherein a front end surface of the encoder that covers the front end surface of the turned-back section is sloped axially inward and radially outward at a radially inner portion, and sloped axially outward and radially outward at a radially outer portion.

A fifth invention is the seal member according to the first to fourth inventions, wherein the labyrinth section is extended by the encoder and the elastic member, between the front end surface of the turned-back section and a side end surface of the inner plate section.

A sixth invention is a bearing device for a wheel, the bearing device including the seal member according to the first to fifth inventions.

Advantageous Effects of Invention

The effects of the present invention are as follows.

In the seal member according to the first invention, the labyrinth section extends axially outward and radially outward. Furthermore, the inner peripheral surface of the encoder that covers the inner peripheral surface of the turned-back section is sloped axially inward and radially outward. According to the seal member, even if muddy water enters the labyrinth section, the muddy water can be discharged by use of a centrifugal force generated by a rotation. Furthermore, even if the muddy water passes through the labyrinth section and enters the inside, the muddy water can be guided to the labyrinth section by use of the centrifugal force generated by the rotation, and can also be discharged by use of the centrifugal force. Therefore, lip wear is suppressed and resistance to muddy water is increased.

In the seal member according to the second invention, the front end surface of the encoder that covers the front end surface of the turned-back section is sloped axially inward and radially outward. According to the seal member, the muddy water can be subjected to the centrifugal force even on the front end surface of the encoder, and thus can be smoothly guided to the labyrinth section. Furthermore, since the muddy water flows from the inner peripheral surface of the encoder to the front end surface of the encoder without stagnation, a flow of the muddy water is not hindered.

In the seal member according to the third invention, the front end surface of the encoder that covers the front end surface of the turned-back section is sloped axially outward and radially outward. According to the seal member, the muddy water can be subjected to the centrifugal force even on the front end surface of the encoder, and thus can be smoothly guided to the labyrinth section. Furthermore, since the muddy water flows from the front end surface of the encoder to the outer peripheral surface of the encoder without stagnation, the flow of the muddy water is not hindered.

In the seal member according to the fourth invention, the front end surface of the encoder that covers the front end surface of the turned-back section is sloped axially inward and radially outward at the radially inner portion, and sloped axially outward and radially outward at the radially outer portion. According to the seal member, it is possible to obtain both the effect that the muddy water flows from the inner peripheral surface of the encoder to the front end surface of the encoder without stagnation and the effect that the muddy water flows from the front end surface of the encoder to the outer peripheral surface of the encoder without stagnation.

In the seal member according to the fifth invention, the labyrinth section is extended by the encoder and the elastic member, between the front end surface of the turned-back section and the side end surface of the inner plate section. According to the seal member, since the labyrinth section is long and complicated and a function of collecting the muddy water is enhanced, it is possible to prevent the muddy water from entering the inside.

The bearing device for a wheel according to the sixth invention is a bearing device for a wheel, the bearing device including the seal member according to the first to fifth inventions. According to the bearing device for a wheel, it is possible to prevent a raceway surface and the rolling element from being damaged due to the above-described effects, so that a bearing life is improved.

DESCRIPTION OF EMBODIMENTS

Figure 1:
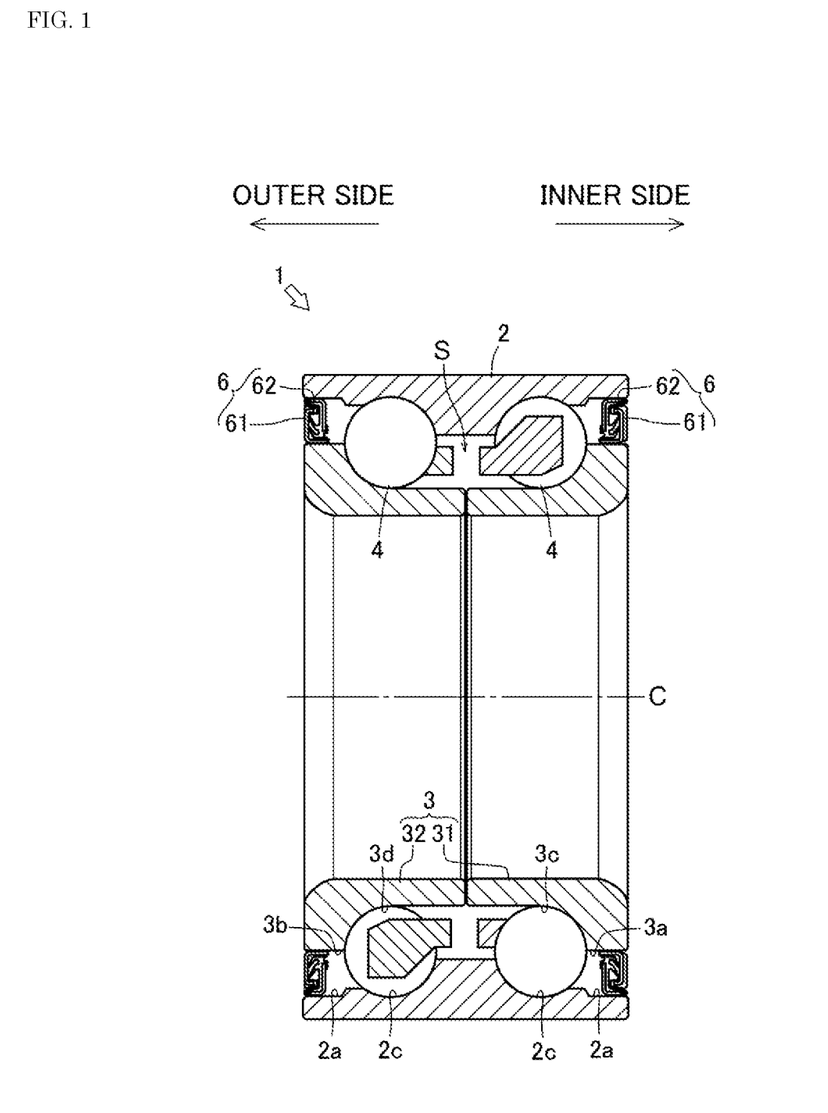
FIG. 1 illustrates a structure of a bearing device for a wheel.
Figure 2:
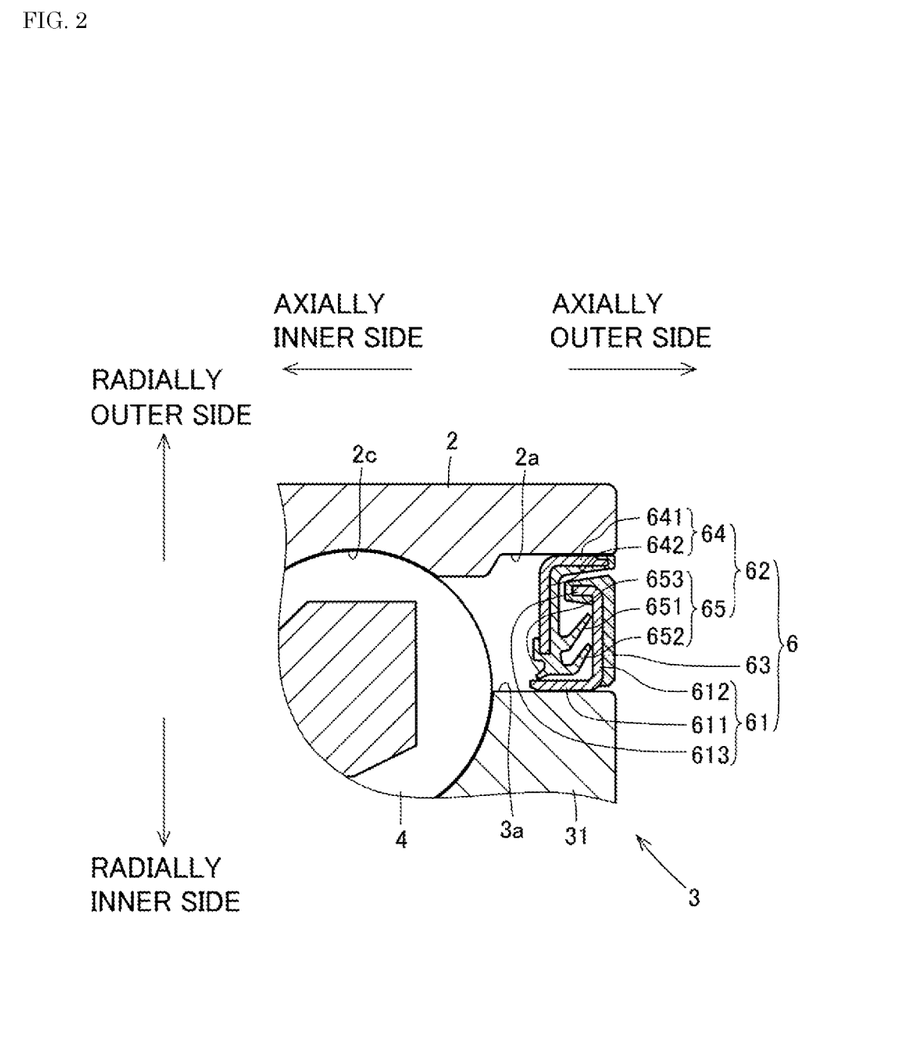
FIG. 2 illustrates a partial structure of the bearing device for a wheel.

First, a bearing device 1 for a wheel according to the present invention will be described. FIG. 1 illustrates a structure of the bearing device 1 for a wheel. FIG. 2 illustrates a partial structure of the bearing device 1 for a wheel.

The bearing device 1 for a wheel rotatably supports a wheel. The bearing device 1 for a wheel is provided with an outer member 2, an inner member 3, and rolling elements 4. Note that, in the present specification, an "inner side" represents a vehicle body side of the bearing device 1 for a wheel when the bearing device 1 for a wheel is mounted on the vehicle body, and an "outer side" represents a wheel side of the bearing device 1 for a wheel when the bearing device 1 for a wheel is mounted on the vehicle body.

The outer member 2 constitutes an outer ring portion of the rolling bearing structure. On each of inner circumferences of an inner side end and an outer side end of the outer member 2, a fitting surface 2a to which a seal ring 62 described later is fitted, and an outer raceway surface 2c adjacent to the fitting surface 2a are formed.

The inner member 3 constitutes an inner ring portion of the rolling bearing structure. The inner member 3 is formed by abutting a first inner member 31 and a second inner member 32 against each other.

On an outer circumference of an inner side end of the first inner member 31, a fitting surface 3a to which a slinger 61 described later is fitted is formed. Furthermore, an inner raceway surface 3c is formed on an outer circumference adjacent to the fitting surface 3a. The inner raceway surface 3c faces the outer raceway surface 2c.

On an outer circumference of an outer side end of the second inner member 32, a fitting surface 3b to which the slinger 61 described later is fitted is formed. Furthermore, an inner raceway surface 3d is formed on an outer circumference adjacent to the fitting surface 3b. The inner raceway surface 3d faces the outer raceway surface 2c.

The rolling elements 4 constitute rolling portions of the rolling bearing structure. An inner side rolling element 4 is interposed between the outer raceway surface 2c of the outer member 2 and the inner raceway surface 3c of the first inner member 31. An outer side rolling element 4 is interposed between the outer raceway surface 2c of the outer member 2 and the inner raceway surface 3d of the second inner member 32.

Incidentally, the present bearing device 1 for a wheel is provided with a pair of seal members 6 in order to seal both open ends of an annular space S formed between the outer member 2 and the inner member 3 (the first inner member 31 and the second inner member 32). Hereinafter, a seal member 6 attached to an inner side open end of the annular space S will be described as an "inner side seal member 6". Note that, since a seal member 6 attached to an outer side open end of the annular space S has substantially the same structure, the same reference numeral is given.

The inner side seal member 6 includes the slinger 61 and the seal ring 62. Here, a direction approaching the annular space S along a central axis C is defined as an "axially inner side", and a direction away from the annular space S along the central axis C is defined as an "axially outer side" (see FIG. 2). Furthermore, a direction approaching the central axis C perpendicularly to the central axis C is defined as a "radially inner side", and a direction away from the central axis C is defined as a "radially outer side" (see FIG. 2).

The slinger 61 is made of a steel plate, and is an annular body having a predetermined cross section. The slinger 61 is formed with an outer fitting section 611 that is externally fitted to the fitting surface 3a of the first inner member 31. Furthermore, the slinger 61 is formed with an outer plate section 612 extending radially outward from an axially outer end of the outer fitting section 611 and a turned-back section 613 extending axially inward from a radially outer end of the outer plate section 612. In addition, an encoder 63 is fixedly attached to the slinger 61. The encoder 63 is an elastic member in which magnetic poles (N pole and S pole) are disposed in a circumferential direction.

The seal ring 62 includes a core metal 64 and an elastic member 65. The core metal 64 is formed with an inner fitting section 641 that is internally fitted to the fitting surface 2a of the outer member 2. Furthermore, the core metal 64 is formed with an inner plate section 642 extending radially inward from an axially inner end of the inner fitting section 641. The elastic member 65 is fixed to the core metal 64 so as to cover an inner peripheral surface 64a of the inner fitting section 641 and a side end surface 64b of the inner plate section 642. The elastic member 65 is formed with two side lips 651 and 652, and respective tip edges of the side lips 651 and 652 are in contact with the outer plate section 612 of the slinger 61 that faces the side lips 651 and 652. Furthermore, the elastic member 65 is formed with one grease lip 653, and a tip edge of the grease lip 653 is in contact with or close to the outer fitting section 611 of the slinger 61 that faces the grease lip 653.

Figure 3:
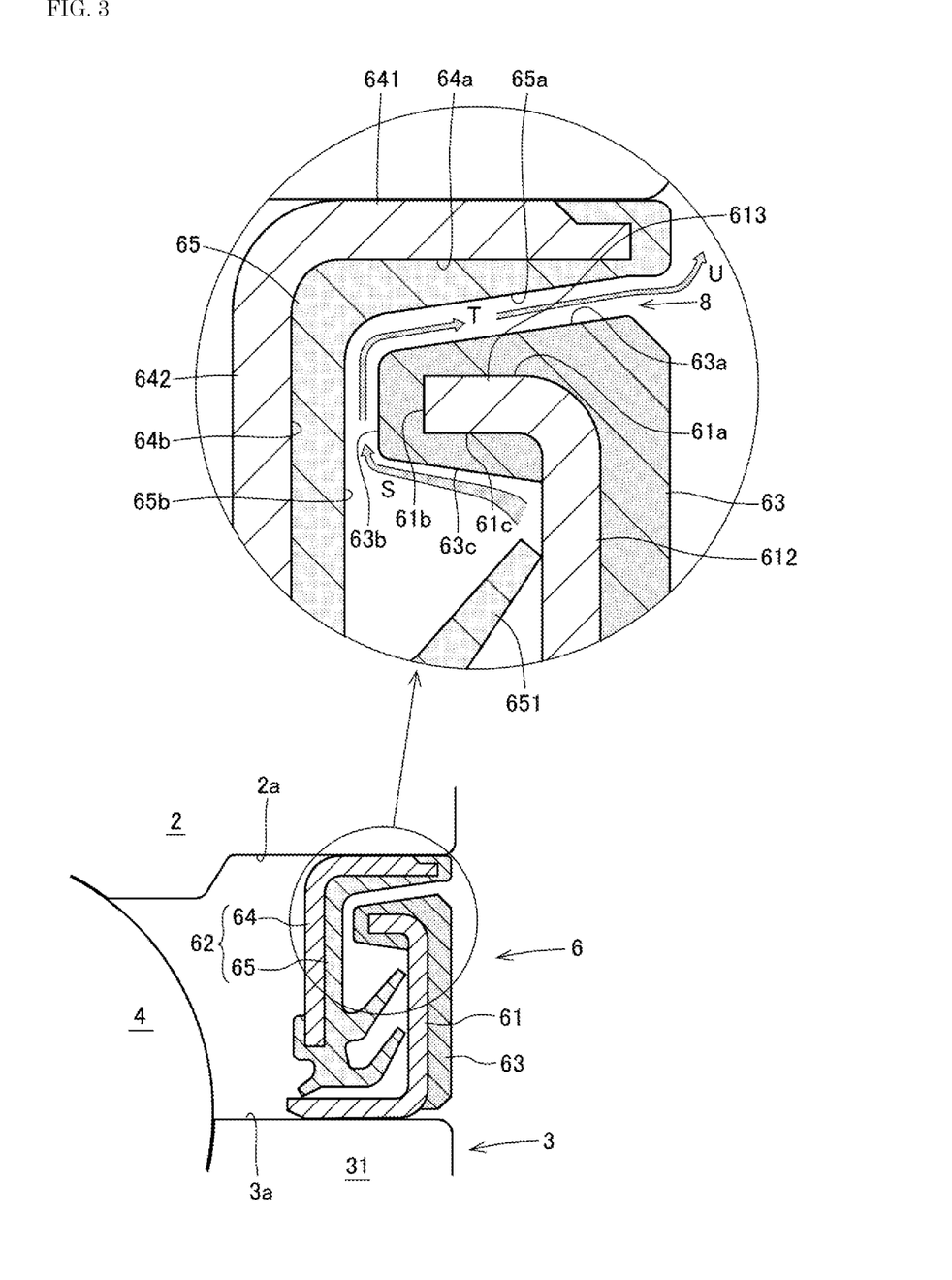
FIG. 3 illustrates a seal member according to a first embodiment.

FIG. 3 is an enlarged view of an outer diameter side portion of the inner side seal member 6. As illustrated in FIG. 3, the encoder 63 covers an inner peripheral surface 61c of the turned-back section 613 so as to wrap around an outer peripheral surface 61a and a front end surface 61b of the turned-back section 613. Thus, an outer peripheral surface 63a of the encoder 63 is located on a radially outer side of the turned-back section 613. Furthermore, a front end surface 63b of the encoder 63 is located on an axially inner side of the turned-back section 613. Furthermore, an inner peripheral surface 63c of the encoder 63 is located on a radially inner side of the turned-back section 613.

An outer diameter of the outer peripheral surface 63a increases toward the axially outer side. Furthermore, an inner diameter of an inner peripheral surface 65a of the elastic member 65 that faces the outer peripheral surface 63a increases toward the axially outer side. Thus, the outer peripheral surface 63a of the encoder 63 and the inner peripheral surface 65a of the elastic member 65 form a narrow gap. In this specification, this gap is defined as a "labyrinth section 8". Note that the outer peripheral surface 63a and the inner peripheral surface 65a each have a straight line segment (referred to as a generatrix line) represented in an axial cross section. However, such a line segment may be a curve whose curvature is constant or changes gradually.

The front end surface 63b extends radially inward from an axially inner end edge of the outer peripheral surface 63a. Furthermore, a side end surface 65b of the elastic member 65 that faces the front end surface 63b also extends radially inward from an axially inner end edge of the inner peripheral surface 65a. Thus, the front end surface 63b of the encoder 63 and the side end surface 65b of the elastic member 65 form a narrow gap. That is, the labyrinth section 8 is extended so as to be bent radially inward. Note that the front end surface 63b and the side end surface 65b each have a straight line segment (referred to as generatrix lines) represented in an axial cross section. However, such a line segment may be a curve whose curvature is constant or changes gradually.

The inner peripheral surface 63c extends axially outward and radially inward from a radially inner edge of the front end surface 63b. An inner diameter of the inner peripheral surface 63c increases toward the axially inner side. Note that the inner peripheral surface 63c has a straight line segment (referred to as a generatrix line) represented in an axial cross section. However, such a line segment may be a curve whose curvature is constant or changes gradually.

Here, assuming that muddy water enters the labyrinth section 8, a process of discharging such muddy water will be described.

The slinger 61 and the encoder 63 rotate together with the first inner member 31, which causes the muddy water staying in the labyrinth section 8 to rotate. The muddy water is then subjected to a centrifugal force radially outward. The muddy water is discharged to the outside through the labyrinth section 8 because the labyrinth section 8 extends axially outward and radially outward (see an arrow U).

Furthermore, assuming that the muddy water passes through the labyrinth section 8 and enters the inside, the process of discharging the muddy water will be described. Here, the "inside" refers to a space surrounded by the slinger 61 and the seal ring 62.

In this case as well, during the rotation of the first inner member 31, the muddy water is subjected to the centrifugal force radially outward. The muddy water is then guided to the labyrinth section 8 along the inner peripheral surface 63c and the front end surface 63b of the encoder 63 (see arrows S and T). At this time, the muddy water is smoothly guided without staying on the inner peripheral surface 63c because the inner peripheral surface 63c is sloped axially inward and radially outward. After that, the muddy water is discharged to the outside through the labyrinth section 8 (see the arrow U). At this time as well, the muddy water is smoothly discharged without staying in the labyrinth section 8 because the labyrinth section 8 extends axially outward and radially outward.

As described above, in the inner side seal member 6 according to the first embodiment, the labyrinth section 8 extends axially outward and radially outward. Furthermore, the inner peripheral surface 63c of the encoder 63 that covers the inner peripheral surface 61c of the turned-back section 613 is sloped axially inward and radially outward. According to the inner side seal member 6, even if the muddy water enters the labyrinth section 8, the muddy water can be discharged by use of the centrifugal force generated by the rotation. Furthermore, even if the muddy water passes through the labyrinth section 8 and enters the inside, the muddy water can be guided to the labyrinth section 8 by use of the centrifugal force generated by the rotation, and can also be discharged by use of the centrifugal force. Therefore, lip wear is suppressed and resistance to muddy water is increased.

Figure 4:
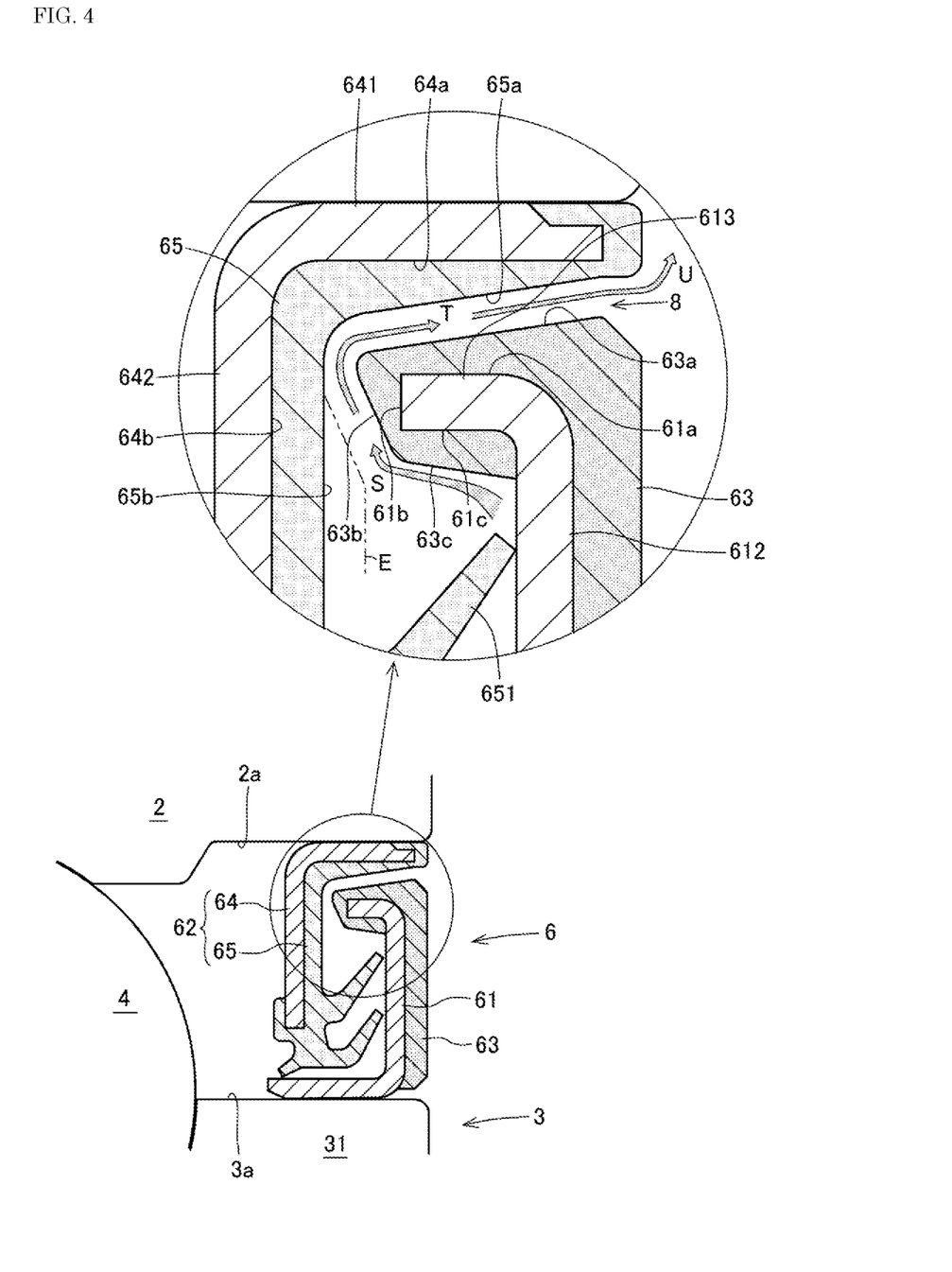
FIG. 4 illustrates a seal member according to a second embodiment.

Next, features and effects of an inner side seal member 6 according to a second embodiment will be described. FIG. 4 illustrates the inner side seal member 6 according to the second embodiment. Note that the inner side seal member 6 according to the second embodiment has substantially the same structure as the inner side seal member 6 according to the first embodiment. Therefore, parts corresponding to each other will be denoted by the same reference numerals, and different parts will be mainly described.

In the inner side seal member 6 according to the present embodiment, a front end surface 63b of an encoder 63 is sloped axially inward and radially outward. This structure is adopted in order that muddy water is continuously subjected to a centrifugal force even on the front end surface 63b of the encoder 63 and is smoothly guided to a labyrinth section 8. That is, the slope of the front end surface 63b of the encoder 63 continuously subjects the muddy water flowing along the front end surface 63b to the centrifugal force, and thus smoothly guides the muddy water to the labyrinth section 8. Furthermore, this structure is adopted in order that the muddy water flows from an inner peripheral surface 63c of the encoder 63 to the front end surface 63b of the encoder 63 without stagnation (see an arrow S).

As described above, in the inner side seal member 6 according to the second embodiment, the front end surface 63b of the encoder 63 that covers a front end surface 61b of a turned-back section 613 is sloped axially inward and radially outward. According to the inner side seal member 6, the muddy water can be subjected to the centrifugal force even on the front end surface 63b of the encoder 63, and thus can be smoothly guided to the labyrinth section 8. Furthermore, since the muddy water flows from the inner peripheral surface 63c of the encoder 63 to the front end surface 63b of the encoder 63 without stagnation, the flow of the muddy water is not hindered.

In addition, in the inner side seal member 6 according to the second embodiment, a side end surface 65b of an elastic member 65 that faces the front end surface 63b of the encoder 63 may be sloped axially inward and radially outward, and a gap between the front end surface 63b and the side end surface 65b may be constant or substantially constant (see a two-dot chain line E in FIG. 4). This can be said to be a long and complicated extension of the labyrinth section 8, and a higher function of collecting the muddy water can be obtained.

As described above, in the inner side seal member 6 according to the second embodiment, the labyrinth section 8 may be extended by the encoder 63 and the elastic member 65, between the front end surface 61b of the turned-back section 613 and a side end surface 64b of an inner plate section 642. According to the inner side seal member 6, since the labyrinth section 8 is long and complicated and the function of collecting the muddy water is enhanced, it is possible to prevent the muddy water from entering the inside.

Figure 5:
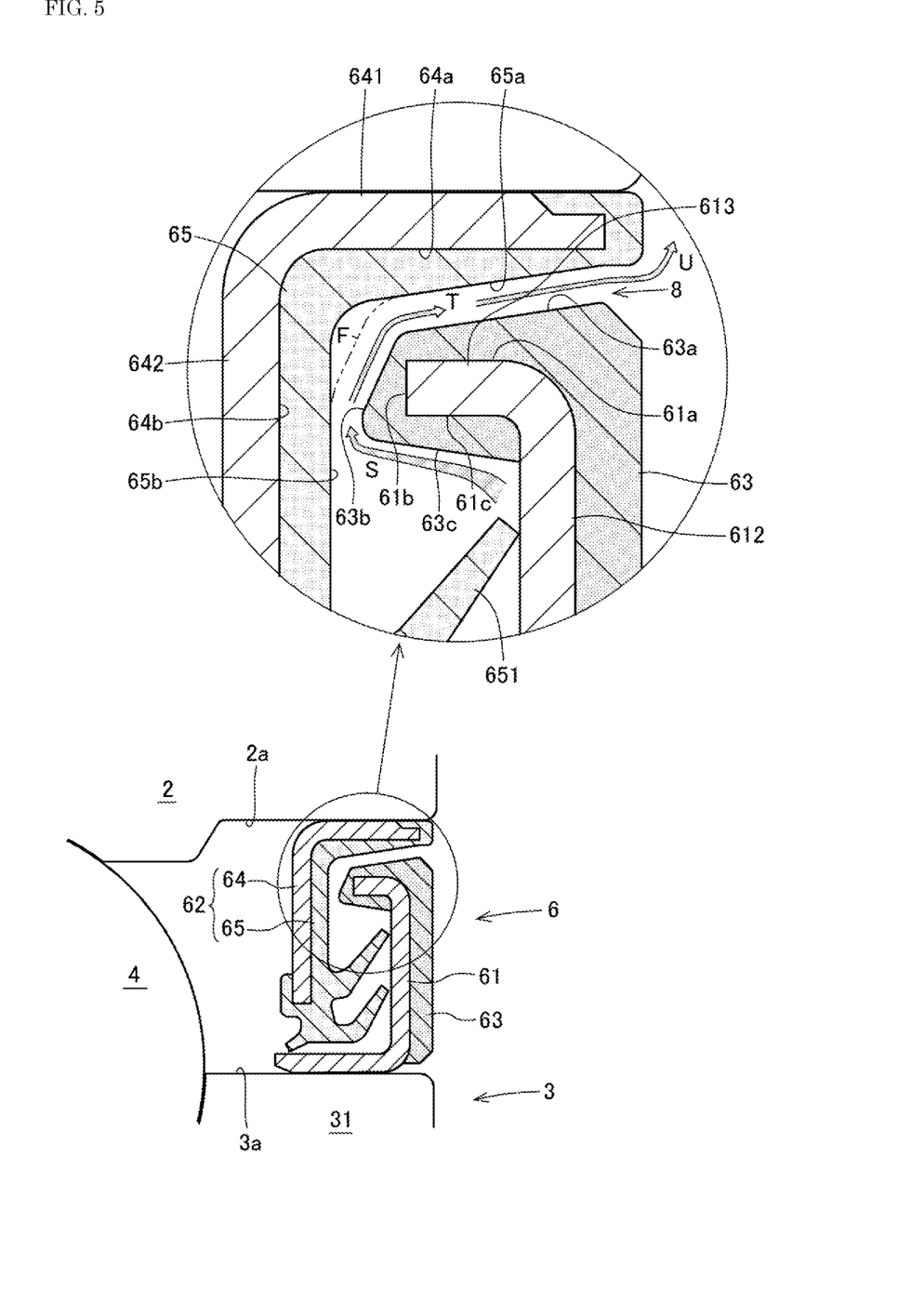
FIG. 5 illustrates a seal member according to a third embodiment.

Next, features and effects of an inner side seal member 6 according to a third embodiment will be described. FIG. 5 illustrates the inner side seal member 6 according to the third embodiment. Note that the inner side seal member 6 according to the third embodiment has substantially the same structure as the inner side seal member 6 according to the first embodiment. Therefore, parts corresponding to each other will be denoted by the same reference numerals, and different parts will be mainly described.

In the inner side seal member 6 according to the present embodiment, a front end surface 63b of an encoder 63 is sloped axially outward and radially outward. This structure is adopted in order that muddy water is continuously subjected to a centrifugal force even on the front end surface 63b of the encoder 63 and is smoothly guided to a labyrinth section 8. That is, the slope of the front end surface 63b of the encoder 63 continuously subjects the muddy water flowing along the front end surface 63b to the centrifugal force, and thus smoothly guides the muddy water to the labyrinth section 8. Furthermore, this structure is adopted in order that the muddy water flows from the front end surface 63b of the encoder 63 to an outer peripheral surface 63a of the encoder 63 without stagnation (see an arrow T).

As described above, in the inner side seal member 6 according to the third embodiment, the front end surface 63b of the encoder 63 that covers a front end surface 61b of a turned-back section 613 is sloped axially outward and radially outward. According to the inner side seal member 6, the muddy water can be subjected to the centrifugal force even on the front end surface 63b of the encoder 63, and thus can be smoothly guided to the labyrinth section 8. Furthermore, since the muddy water flows from the front end surface 63b of the encoder 63 to the outer peripheral surface 63a of the encoder 63 without stagnation, the flow of the muddy water is not hindered.

In addition, in the inner side seal member 6 according to the third embodiment, a side end surface 65b of an elastic member 65 that faces the front end surface 63b of the encoder 63 may be sloped axially outward and radially outward, and a gap between the front end surface 63b and the side end surface 65b may be constant or substantially constant (see a two-dot chain line F in FIG. 5). This can be said to be a long and complicated extension of the labyrinth section 8, and a higher function of collecting the muddy water can be obtained.

As described above, in the inner side seal member 6 according to the third embodiment, the labyrinth section 8 may be extended by the encoder 63 and the elastic member 65, between the front end surface 61b of the turned-back section 613 and a side end surface 64b of an inner plate section 642. According to the inner side seal member 6, since the labyrinth section 8 is long and complicated and the function of collecting the muddy water is enhanced, it is possible to prevent the muddy water from entering the inside.

Figure 6:
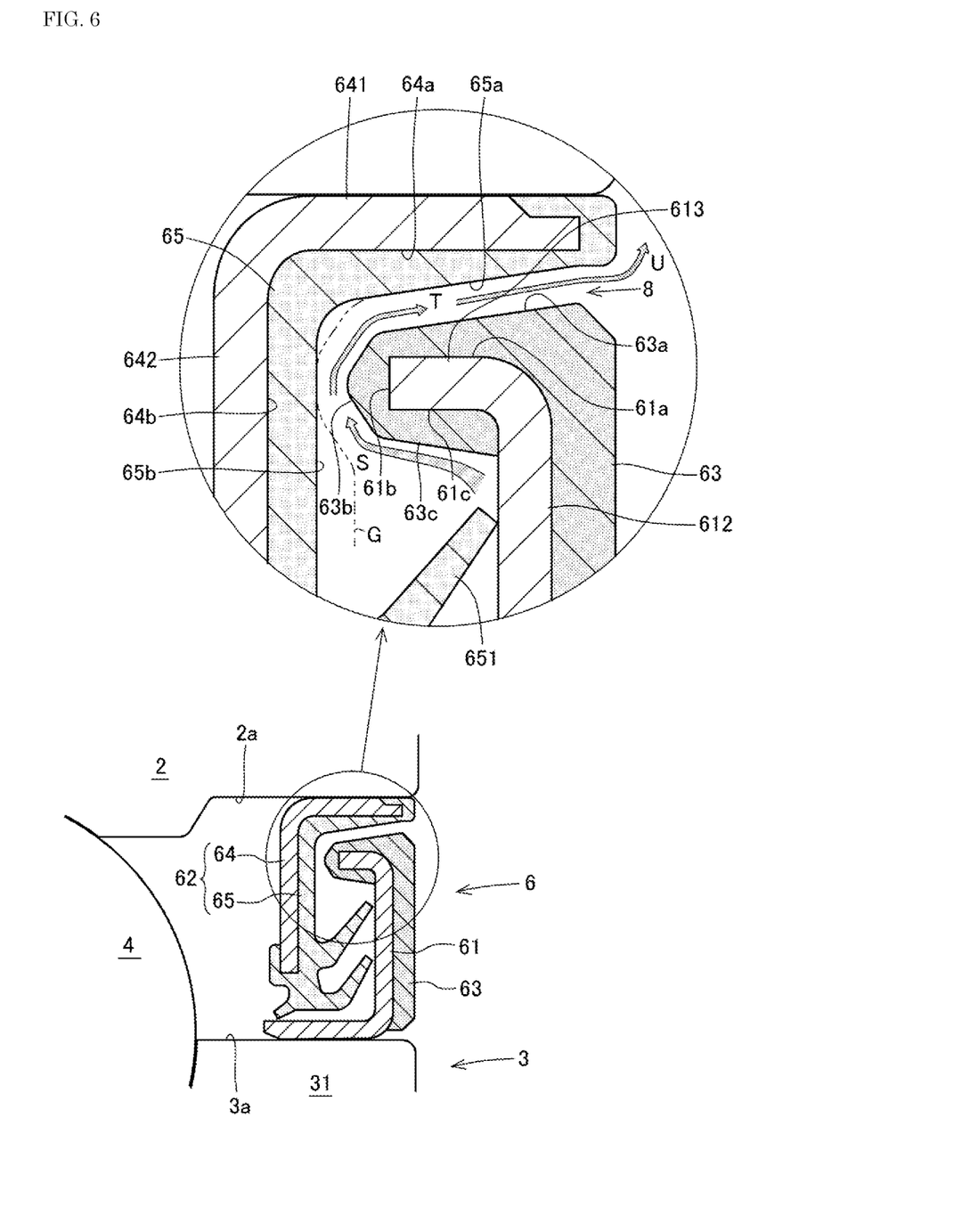
FIG. 6 illustrates a seal member according to a fourth embodiment.

Next, features and effects of an inner side seal member 6 according to a fourth embodiment will be described. FIG. 6 illustrates the inner side seal member 6 according to the fourth embodiment. Note that the inner side seal member 6 according to the fourth embodiment has substantially the same structure as the inner side seal member 6 according to the first embodiment. Therefore, parts corresponding to each other will be denoted by the same reference numerals, and different parts will be mainly described.

In the inner side seal member 6 according to the present embodiment, a front end surface 63b of an encoder 63 is sloped axially inward and radially outward at a radially inner portion, and sloped axially outward and radially outward at a radially outer portion. This structure is adopted in order that muddy water is continuously subjected to a centrifugal force even on the front end surface 63b of the encoder 63 and is smoothly guided to a labyrinth section 8. That is, the slope of the front end surface 63b of the encoder 63 continuously subjects the muddy water flowing along the front end surface 63b to the centrifugal force, and thus smoothly guides the muddy water to the labyrinth section 8. Furthermore, this structure is adopted in order that the muddy water flows from an inner peripheral surface 63c of the encoder 63 to the front end surface 63b of the encoder 63 without stagnation, and the muddy water also flows from the front end surface 63b of the encoder 63 to an outer peripheral surface 63a of the encoder 63 without stagnation (see arrows S and T).

As described above, in the inner side seal member 6 according to the fourth embodiment, the front end surface 63b of the encoder 63 that covers a front end surface 61b of a turned-back section 613 is sloped axially inward and radially outward at the radially inner portion, and sloped axially outward and radially outward at the radially outer portion. According to the inner side seal member 6, it is possible to obtain both the effect that the muddy water flows from the inner peripheral surface 63c of the encoder 63 to the front end surface 63b of the encoder 63 without stagnation and the effect that the muddy water flows from the front end surface 63b of the encoder 63 to the outer peripheral surface 63a of the encoder 63 without stagnation.

In addition, in the inner side seal member 6 according to the fourth embodiment, a side end surface 65b of an elastic member 65 that faces the front end surface 63b of the encoder 63 may be sloped axially outward and radially outward at a radially inner portion and sloped axially outward and radially outward at the radially outer portion, and a gap between the front end surface 63b and the side end surface 65b may be constant or substantially constant (see a two-dot chain line G in FIG. 6). This can be said to be a long and complicated extension of the labyrinth section 8, and a higher function of collecting the muddy water can be obtained.

As described above, in the inner side seal member 6 according to the fourth embodiment, the labyrinth section 8 may be extended by the encoder 63 and the elastic member 65, between the front end surface 61b of the turned-back section 613 and a side end surface 64b of an inner plate section 642. According to the inner side seal member 6, since the labyrinth section 8 is long and complicated and the function of collecting the muddy water is enhanced, it is possible to prevent the muddy water from entering the inside.

Finally, the bearing device 1 for a wheel has a first-generation structure mainly including the outer member 2, the inner member 3, and the rolling elements 4, but is not limited to this. For example, the bearing device 1 for a wheel may have an inner member rotation type second-generation structure in which the outer member includes a vehicle body mounting flange and a hub wheel is inserted into the inner member. Alternatively, the bearing device 1 for a wheel may have an outer member rotation type second-generation structure in which the outer member is a hub wheel including a wheel mounting flange and a support shaft is inserted into the inner member. Furthermore, the bearing device 1 for a wheel may have an inner member rotation type third-generation structure in which the outer member includes the vehicle body mounting flange and the inner member is the hub wheel including the wheel mounting flange. Furthermore, the bearing device 1 for a wheel may have an outer member rotation type third-generation structure in which the outer member is the hub wheel including the wheel mounting flange and the inner member is a support shaft including the vehicle body mounting flange. Furthermore, the bearing device 1 for a wheel may have a fourth-generation structure in which the outer member includes the vehicle body mounting flange and the inner member is a fitted body of the hub wheel including the wheel mounting flange and a universal joint.

INDUSTRIAL APPLICABILITY

The present invention is applicable to a seal member and bearing device for a wheel, provided with the seal member.

The invention claimed is:

1. A seal member for a bearing device for a wheel, the bearing device being provided with an outer member, an inner member, and a rolling element interposed between the outer member and the inner member,
the seal member comprising: a slinger; and a seal ring, wherein
the slinger includes an outer fitting section that is externally fitted to the inner member, an outer plate section that extends radially outward from an axially outer end of the outer fitting section, a turned-back section that extends axially inward from a radially outer end of the outer plate section, and an encoder that is fixedly attached to the outer plate section and covers at least an outer peripheral surface, a front end surface, and an inner peripheral surface of the turned-back section,
the seal ring includes a core metal that is fitted to the outer member,
the core metal includes an inner fitting section that is internally fitted to the outer member and an inner plate section that extends radially inward from an axially inner end of the inner fitting section, an elastic member that is fixedly attached to the inner plate section covers at least an inner peripheral surface of the inner fitting section,
a labyrinth section is formed by the encoder and the elastic member, between the outer peripheral surface of the turned-back section and the inner peripheral surface of the inner fitting section,
the labyrinth section extends axially outward and radially outward,
an inner peripheral surface of the encoder that covers the inner peripheral surface of the turned-back section is sloped axially inward and radially outward,
an outer peripheral surface of the encoder that covers the outer peripheral surface of the turned-back section is sloped axially outward and radially outward, and
a front end surface of the encoder that covers the front end surface of the turned-back section is sloped axially inward and radially outward.

2. The seal member according to claim 1, wherein the labyrinth section is extended by the encoder and the elastic member between the front end surface of the turned-back section and a side end surface of the inner plate section.

3. A bearing device for a wheel, the bearing device comprising the seal member according to claim 1.

* * * * *